(12) United States Patent
Burukhin et al.

(10) Patent No.: US 7,849,923 B2
(45) Date of Patent: Dec. 14, 2010

(54) PROPPANT ENTRAINMENT PREVENTION METHOD

(75) Inventors: Alexander Alexandrovich Burukhin, Novosibirsk (RU); Anatoly Vladimirovich Matveev, Novosibirsk (RU); Elena Mikhailovna Pershikova, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 86 days.

(21) Appl. No.: 11/959,061

(22) Filed: Dec. 18, 2007

(65) Prior Publication Data

US 2008/0156490 A1    Jul. 3, 2008

(30) Foreign Application Priority Data

Dec. 29, 2006   (RU)   ................ 2006147204

(51) Int. Cl.
*E21B 43/267*   (2006.01)
*C09K 8/80*    (2006.01)

(52) U.S. Cl. ............. 166/280.2; 166/280.1; 166/308.3; 428/402; 507/269; 507/924

(58) Field of Classification Search ........ None
See application file for complete search history.

(56) References Cited

U.S. PATENT DOCUMENTS

| | | | |
|---|---|---|---|
| 5,330,005 A | 7/1994 | Card et al. | |
| 5,604,184 A | 2/1997 | Ellis et al. | |
| 5,908,073 A | 6/1999 | Nguyen et al. | |
| 6,059,034 A | 5/2000 | Rickards et al. | |
| 6,330,916 B1* | 12/2001 | Rickards et al. | 166/280.2 |
| 6,330,926 B1 | 12/2001 | Heimbrock et al. | |
| 6,725,930 B2 | 4/2004 | Boney et al. | |
| 2004/0188093 A1 | 9/2004 | Funchess | |
| 2006/0151170 A1* | 7/2006 | Brannon et al. | 166/280.2 |
| 2007/0209795 A1* | 9/2007 | Gupta | 166/278 |

* cited by examiner

*Primary Examiner*—George Suchfield
(74) *Attorney, Agent, or Firm*—David Cate; Robin Nava; Jeff Griffin

(57) ABSTRACT

Elimination of sand entrainment and a significant increase in hydrodynamic permeability of the sand pack in an area near the wellbore are achieved through the use of a sand and/or proppant, and proppant material mixture at the final stage of the fracture filling process, where individual particles of the proppant material have at least one shape of plates, lattices, hollow bars, inside-hollow tubes with a closed impermeable cavity or cavities, toroidal particles, elongated particles in the form of ovals, pellets or plates, cylinders with a closed impermeable cavity or cavities, or blocks with a comb multi-channel structure with throughout channels of the ellipse or polygon cross-section.

2 Claims, 4 Drawing Sheets

PROPPANT ENTRAINMENT PREVENTION METHOD

This application claims foreign priority benefits to Russian Patent Application No. 2006147204, filed on Dec. 29, 2006.

FIELD OF THE INVENTION

This invention relates to the oil and gas industry, in particular, to the technology for preventing proppant/sand entrainment from a reservoir with a simultaneous hydrodynamic conductivity increase and $\beta$-factor decrease in the near wellbore area.

BACKGROUND

The statements in this section merely provide background information related to the present disclosure and may not constitute prior art.

At present, the following methods are implemented to prevent proppant entrainment:

lattices and gravel-packed filters;

chemically binding proppants and soluble additives to these proppants to increase conductivity of the pack;

sticky agents for surface/fluid modification;

soluble materials and deformable additives;

fibers.

A device for proppant entrainment prevention and a method for installation of the said device in a subsurface formation are known. A lattice is installed in a perforated section of pipe and closes perforations. The size of meshes is selected in a way to prevent proppant entrainment and to increase production of hydrocarbons.

However, the application of an integral part of the lattice may cause the accumulation of sand or proppant near the lattice surface and consequently reduces the conductivity in this area.

A method and device for completion and providing control over sand entrainment from a subsurface formation and/or for formation fracturing and prevention of proppant entrainment in one run in known. One or more perforating shots are connected and covered with one or several nets. When shots are installed in a well and adjusted, then they are blasted to penetrate formation. Perforations holes and annulus space are isolated from the well by the lattice which is then packed with gravel. Well fluid can be under pressure before the shots detonate; as a result, the permeability grows.

However, the application of this method may be limited by relief and well structure features.

In another known method, proppant covered with a cross-linking polymer is injected to prop a fracture. Technical effect is obtained due to a) use of a polymer-covered proppant and a fluid containing a furfurol spirit's polymerizable oligomer, a catalyst containing oil-soluble, slightly watersoluble organic acid, and a compound ether of a weak organic acid to absorb water formed in the polymerization process; b) use of brine water saturated by 70% or 100% with sodium chloride as a carrying medium; c) polymer-covered proppant in a carrying fluid when the time of a polymerization catalyst addition is varied. However, the application of this method assumes the availability of expensive and difficult-to-use chemical compounds, which alongside with the applied multi-stage process, makes this process much more expensive.

In another known method, proppant grains comprising a substrate with a rubber (elastomer) coating are used to prevent entrainment of particles from a reservoir. Proppant particles could have a coating made of polymers, fiber materials and/or soluble polymer, in addition to the elastomer coating.

In another known method for subsurface formation fracturing, at least part of a fracture is filled with a propping material in the form of elongated particles with a maximum-to-minimum diameter ratio of over 5, preferable option—metal wire segments. The remaining part of the fracture is filled with a standard non-metal proppant. In this case, the conductivity of the fracture improves.

A method of subsurface formation treatment by filling a fracture with a propping material and deformable particles is known. Deformable particles could be combined with a proppant to increase conductivity of the fracture, decrease formation of fine-milled particles and/or reduce backflow of proppant. Sand can be used as fracturing material, and polystyrene divinylbenzene balls are used as deformable particles.

In another known method for propping fractures in a subsurface formation, the prevention of the proppant backflow from the fracture is implemented alongside with the fracturing operation. The method is based on the application of a fiber bundles & proppant mixture for filling the fracture when it is kept open, and thereafter the fracture is allowed to close on the fiber & proppant mixture. As per patent, the backflow of proppant is prevented through the use of fiber bundles comprising 5 to 200 individual fibers with a length of 0.8 to 2.5 mm and with a diameter of 10 to 1,000 µm.

The addition of fibers or fiber-like structures in the product could contribute to the proppant backflow reduction and simultaneously increase the proppant pack density in the fracture. Fibers also allows to diminish the migration of a fine-milled proppant in the fraction, however, does not allow to eliminate this phenomenon at all.

In one known method for monitoring over proppant entrainment from a subsurface formation, the addition of fiber materials in the fracturing mixture and in the downhole gravel-packed filter reduces the backflow of proppant and/or the formation of fine-milled crumbles in the pack; this stabilizes the packing and reduces the need for high-polymeric fluids. Glass, aramid, nylon or other natural and synthetic, organic and inorganic fibers and metal filaments are the preferred material for fibers.

There is also a known method in which a subsurface formation is treated by injecting a mixture of ordinary proppant and deformable particles in the formation. Deformable particles could be combined with the ordinary proppant to improve conductivity, decrease formation of fine-milled proppant crumbles and/or diminish the backflow of the proppant. Sand and deformable particles such as polystyrene divinylbenzene balls could be used as a propping agent. Also, this patent claims the possibility of using natural materials (nut shells, seeds, fruit kernels and processed wood) for this purpose. However, natural materials introduce additional amount of fine-milled material in the pack and, thus, decrease the conductivity.

SUMMARY OF THE INVENTION

This invention relates to the oil and gas industry, in particular, to the technology for preventing proppant/sand entrainment from a reservoir with a simultaneous hydrodynamic conductivity increase and $\beta$-factor decrease in the near wellbore area.

In a first embodiment, provided is a method of proppant entrainment prevention including introducing in a final stage of a fracture filling process, a proppant material and at least one of a sand or proppant, where particles forming the proppant material have at least one of a shape selected from the group consisting of plates, lattices, hollow bars, inside-hollow tubes with a closed impermeable cavity or cavities, or toroidal particles. The proppant material may be any one or more of ceramics, glassworks, glass-ceramics, cement, expanded-clay lightweight concrete, polymer, and metal. Plates may be formed of stainless steel, while lattices may be stainless steel or carbon steel. Where hollow bars are present as proppant material, they may have beveled sharpened edges, and when used, inside-hollow tubes may have closed edges and beveled sharpened edges.

In another embodiment, a method of proppant entrainment prevention including injection sand and/or proppant and proppant material mixture in a final stage of a fracture filling process is disclosed, where the proppant material has an elongated shape which is at least one of oval, pellet or plate. The proppant material may be made of any of ceramics, glassworks, glass-ceramics, cement, expanded-clay lightweight concrete, polymer, and metal. The proppant material may also be ceramics, glassworks, glass-ceramics, cement, expanded-clay lightweight concrete, polymer, and metal.

In yet another embodiment, methods of proppant entrainment prevention by injecting sand and/or proppant and proppant material mixture in a final stage of a fracture filling process, individual particles of the proppant material having a shape of blocks with a comb multi-channel structure with throughout channels of the ellipse or polygon cross-section, and the polygon has at least three sides and the block containing channels has the ellipse or polygon cross-section, with a minimum number of polygon sides equal to 3, is provided. The proppant material may be at least one of ceramics, glassworks, glass-ceramics, cement, expanded-clay lightweight concrete, polymer, and metal. The proppant material particles may have a shape with a big-to-small side ratio in excess of 5.

A method of proppant entrainment prevention where sand and/or proppant and proppant material mixture is used at the final stage of a fracture filling process, and where cylinders with a closed impermeable cavity or cavities are used as a proppant material, is disclosed in another embodiment.

In another aspect, the invention is a method of proppant entrainment prevention where a sand and/or proppant and proppant material mixture is used at the final stage of the fracture filling process, and where individual particles of the proppant material are shaped as blocks with a 3D comb-arch permeable or impermeable structure, the blocks shaped as a sphere or a regular/irregular parallelepiped. The proppant material may be at least one of ceramics, glassworks, glass-ceramics, cement, expanded-clay lightweight concrete, polymer, and metal.

In yet another aspect, the invention is a method of proppant entrainment prevention where a sand and/or proppant and proppant material mixture is used at the final stage of the fracture filling process, where particles forming the proppant material have at least one shape selected from the group consisting of plates, lattices, hollow bars, inside-hollow tubes with a closed impermeable cavity or cavities, toroidal particles, elongated particles in the form of ovals, pellets or plates, cylinders with a closed impermeable cavity or cavities, blocks with a comb multi-channel structure with throughout channels of the ellipse or polygon cross-section, where the polygon has at least three sides and the block containing channels has the ellipse or polygon cross-section, with a minimum number of polygon sides equal to 3, blocks with a 3D comb-arch permeable or impermeable structure, and where the blocks are shaped as a sphere or a regular/irregular parallelepiped.

BRIEF DESCRIPTION OF THE DRAWAINGS

Figure 4:
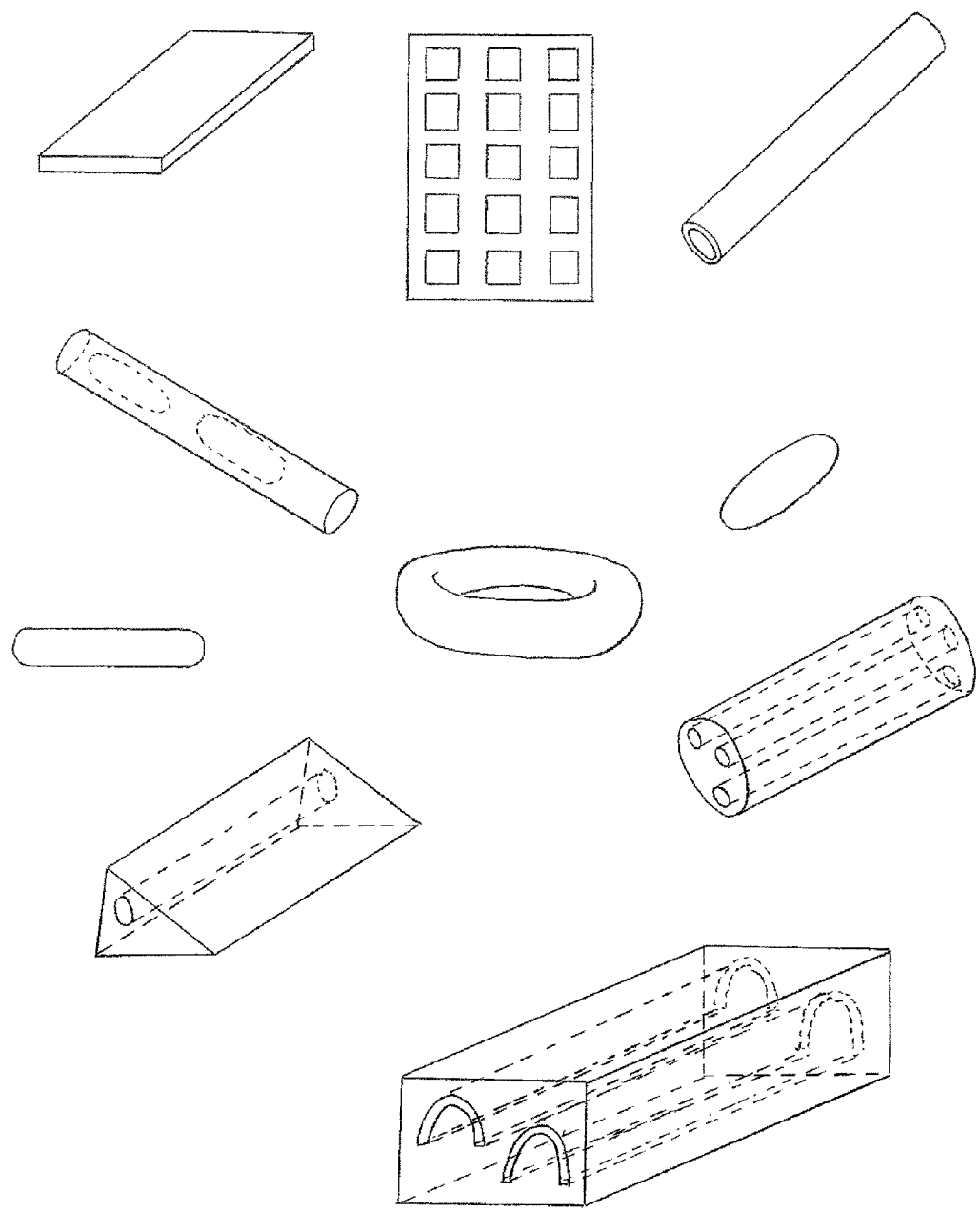

FIG. 4 illustrates the proppant materials having a shape of plates, lattices, hollow bars, inside-hollow tubes with a closed impermeable cavity or cavities, toroidal particles, elongated particles in the form of ovals, pellets or plates, cylinders with a closed impermeable cavity or cavities, blocks with a comb multi-channel structure with throughout channels of the ellipse or polygon cross-section, blocks with a 3D comb-arch permeable or impermeable structure, and wherein the blocks are shaped as a sphere or a regular/irregular parallelepiped.

DESCRIPTION OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

In some embodiments, the invention relates to proppant entrainment elimination methods at the end section of the fracture, which is located near a wellbore, to enhance conductivity and productivity of the well.

A positive effect to be achieved through the implementation of the proposed method, is the elimination of sand entrainment, and significant increase in hydrodynamic permeability of the sand pack in the near wellbore area.

This method aims to prevent proppant/sand entrainment from a subsurface formation. For this purpose, part of the fracture located near the wellbore is filled with a mixture of sand/proppant with a propping material with the size ratio of more than about 5. The proppant material can be available in the form of stainless steel plates or stainless steel/low-carbon steel lattice.

Figure 1:
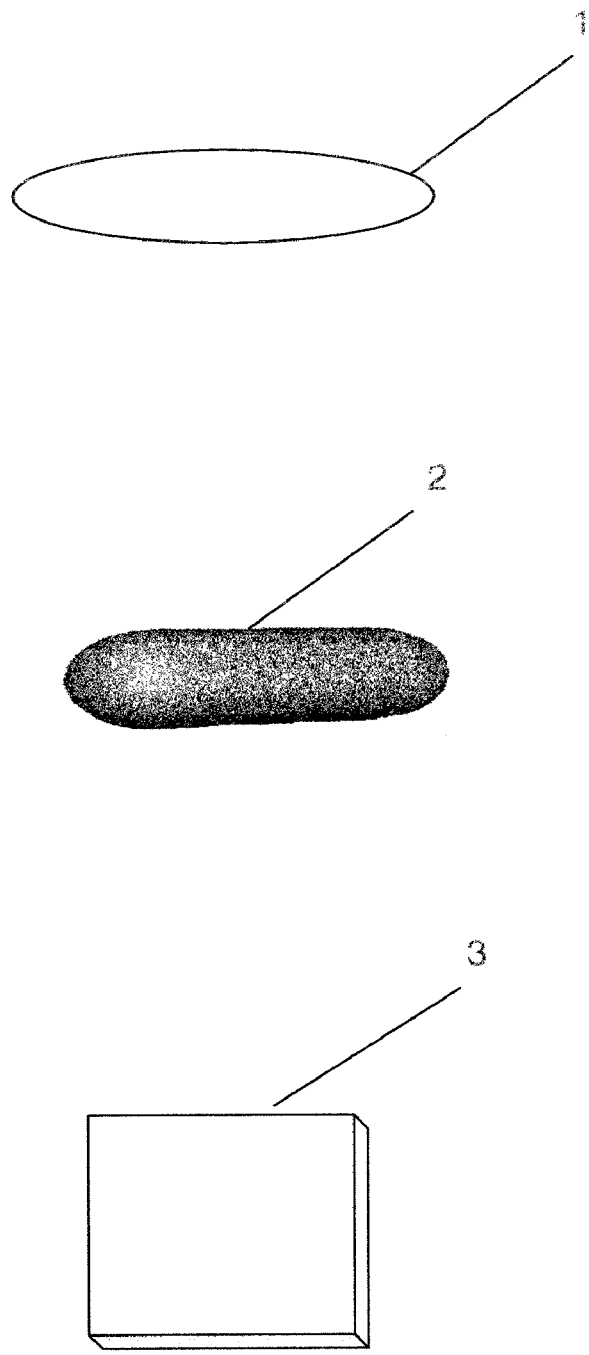
FIG. 1 shows the proppant material having an elongated shape of (1) oval, (2) pellet, and (3) plate.
Figure 2:
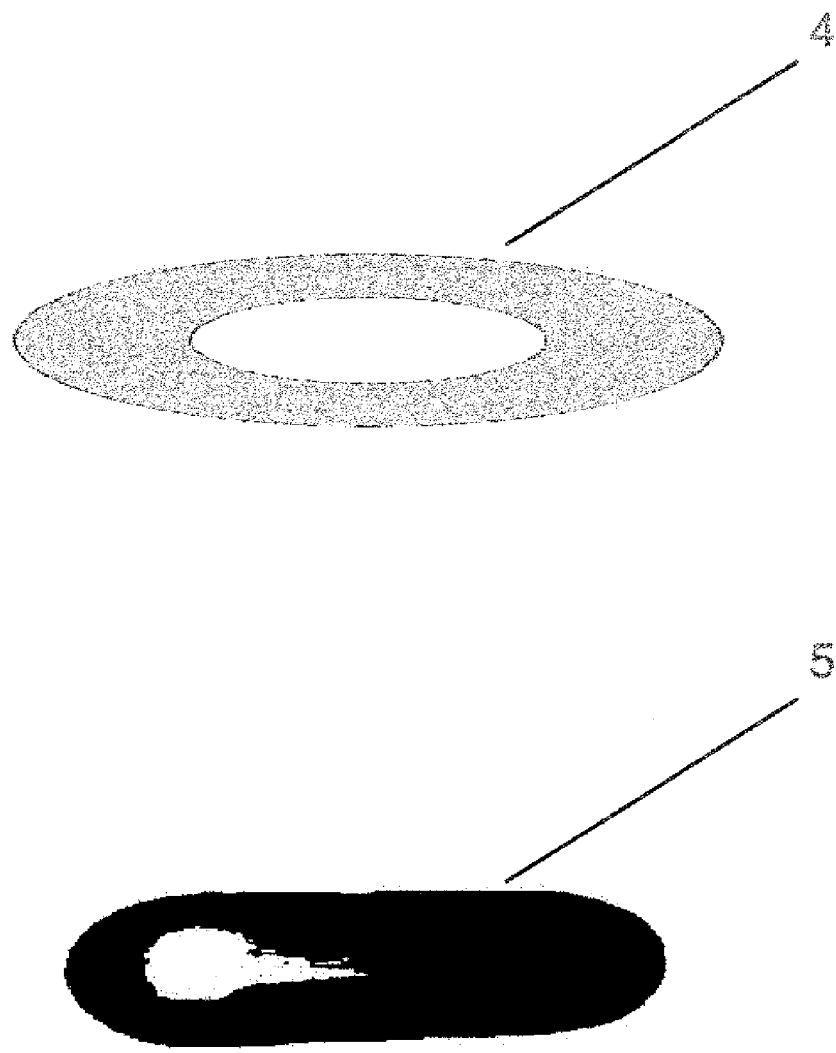
FIG. 2 illustrates the proppant material having a shape of ovals or pellets with inner closed impermeable cavity where (4) is oval with inner closed impermeable cavity, and (5) pellet with inner closed impermeable cavity.

Elongated ceramic particles in the form of ovals, cylinders or plates can be used as a proppant, as shown in FIG. 1, items 1, 2 and 3. Also, elongated ceramic particles in the form of ovals, pellets or cylinders with a closed impermeable cavity inside them, as shown in FIG. 2, items 4 and 5.

Figure 3:
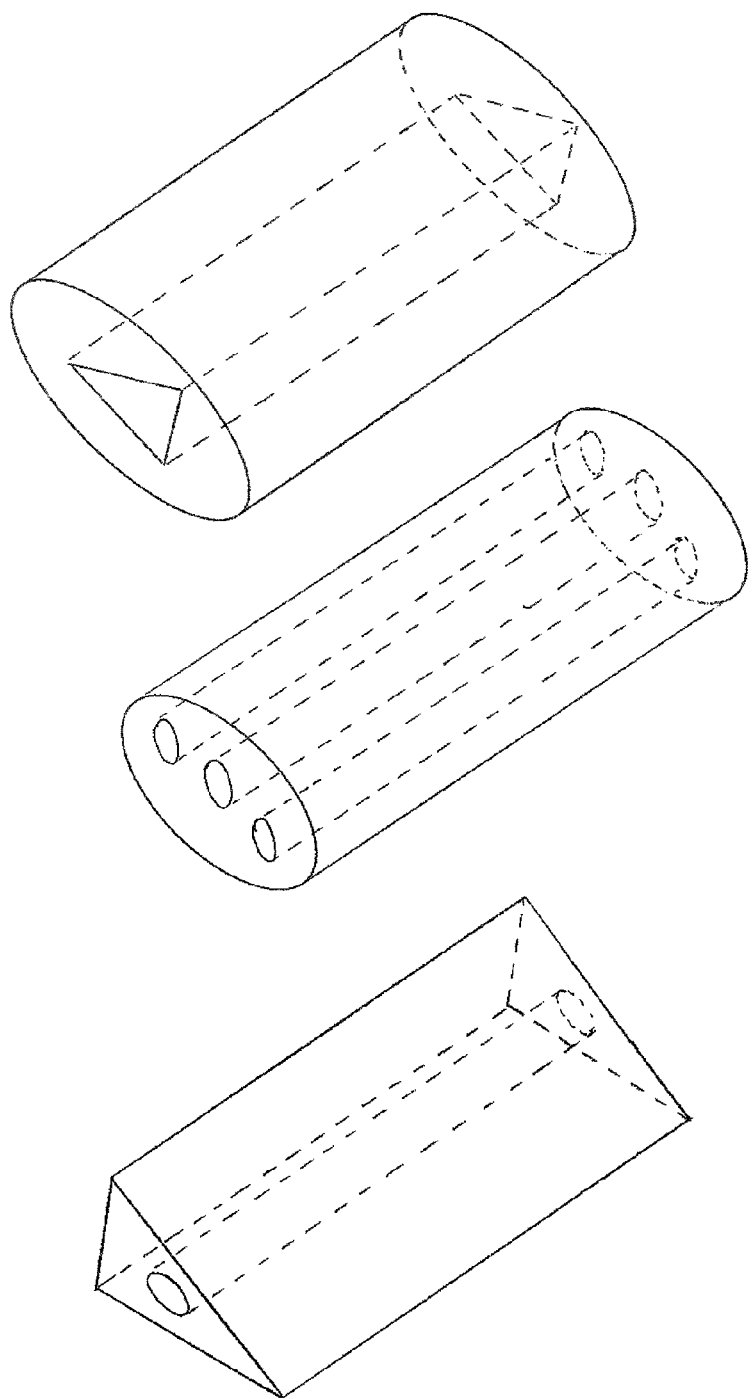
FIG. 3 shows the proppant materials having a shape of blocks with a comb multi-channel structure with throughout channels of the ellipse or polygon cross-section.

Complex structures could be used as proppant material in the proppant entrainment prevention method, as shown in FIGS. 3 and 4.

Any suitable material may be used as proppant material, including for example steel plates or lattice plates.

Increased conductivity can also be achieved through the use of hollow bars with a cavity inside these bars, either with or without welded ends, as a proppant material. The bar ends can be wedge-shaped and sharpen.

Elongated ceramic particles in the form of ovals, cylinders or plates can be used as a proppant. Also, elongated ceramic particles in the form of ovals, pellets or cylinders with a closed impermeable cavity inside them.

Complex structures could be used as proppant material in the proppant entrainment prevention method.

These blocks with a honeycomb multi-channel structure with the throughout channels and a circular or polygon cross-section; the polygon should have at least three sides. Meanwhile, each block comprising channels has a circular or polygon cross-section; the polygon should have at least three sides and a ratio of the cross-section area-to-length for the block of less than $1/5$. Blocks with honeycomb multi-channel structure can be made of ceramics, glass, glass-ceramics, cement expanded-clay concrete, polymer, and metals.

The efficiency of the proposed method with the application of the claimed lattice or steel plates with a size ratio of more than 5, which are used as an additive for preventing proppant entrainment, is explained by their specific armoring properties. For example, armoring properties of cut wires with different parameters are well-known for cased when cement is applied for armoring. Flat welded wire elements facilitate the formation of bonds with cement through a mechanical fixing of each individual welded part. Deformable elements are also used for binding and fixing cement structures. Cement armoring is one of the widely used applications of wires and wire structures.

It was found experimentally that armoring properties of steel (metal) plates could be successfully implemented for strengthening a proppant/sand pack without the used of binding additives such as cement or polymer coating of the proppant/sand surface. Steel plates or lattice plates improves stability of the pack by consolidating proppant/sand grains as a result of a contact with the plates. The effect of particles' pressing into the plate or lattice surface contributes to strengthening of the pack against the proppant/sand entrainment. If steel plates are used, the pressing-in effect does not manifest it as strong as takes place in case of lattice plates; however, steel plates also slightly deform due to pressing-in of sand.

In case if lattice plates are used, the pack armoring effect is displayed more strongly due to the interaction of sand grains with the lattice. Sand grains are forced into the lattice cells under pressure, which also leads to a stronger fixation of sand grains and could also contribute to the sand pack consolidation.

Experimental studies were performed using lattice plates with a mesh size of 0.26 mm for 15% and 30% by weight. A unit for proppant entrainment tests was employed in all experiments. The pour sand pack (Badger 20/40) is known to be absolutely instable to sand entrainment at 7,000 psi. The pack bursts already at a flow rate of 200 ml/min. It also should be mentioned that a pressure drop starts even at a lower flow rate, which is an evidence that the sand pack bursts forth even earlier. Then, the sand pack was armored with stainless steel lattice plates (2×6 mm), 15% by weight, which allowed us to obtain a stable pack and completely prevent sand entrainment even at water flow rate of 20 l/min.

Experiments on sand pack armoring with stainless steel plates (2×6 mm; stainless steel grade 12×18H10; analog 304) 30% and 10% by weight were also conducted. In these experiments, Russian sand, grade Stroyservisindustriya 0.6-0.8 mm, was used. This type of sand is more angular as compared to the Badger sand. That's why the pure sand pack is somewhat more stable to the burst as compared to the Badger sand, due to a better adherence of sand particles with each other. A complete burst of the pack was observed at a flow rate of 500 ml/min for the case when sand was compacted under pressure of 5,000 psi.

An experiment to armor the pack with stainless steel plates by 30% (by weight) was held. The pack burst test was conducted at a pressure of 5,000 psi. Maximum flow rate which was reached in the experiment was 6.7 l/min at a fluid pressure of 45 atm. The pack remained stable under these conditions.

A sand pack burst experiment at a steel plate ratio of 10% (by weight) was performed. It was found that even 10% of steel plates completely prevents sand entrainment from the pack. Water flow at maximum flow reached 12 l/min at a fluid pressure of 41.3 atm.

It should also be mentioned that bigger amount of steel plates in the sand pack causes fluid pressure increase and fluid flow rate decrease.

Experiments on measuring the permeability properties of the Stroyservisindustriya 0.6-0.8 mm and Badger 20/40 sands were also performed. In case of using Badger 20/40, it was found that the addition of 30% of lattice plates results in a 2.5-fold permeability increase and in a 4-fold β-factor decrease at 7,000 psi as compared to a sand pack without additives. In case of using the Stroyservisindustriya 0.6-0.8 mm sand, the sand pack permeability with a lattice plate ratio of 30% grows 10-fold and β-factor drops by more than 10-fold at a pressure of 7,000 psi as compared to a pack of the same sand without additives.

Therefore, it was proved experimentally that these additives could be successfully implemented both for enhancing hydrodynamic conductivity and proppant entrainment prevention & β-factor reduction, which could be of a great importance in an area near the perforated section due to a higher flow velocity exactly in this area. In this particular case, the possibility to significantly reduce β-factor due to high flow velocities and, therefore, a large productivity of the well.

Percentage ratio of the above-mentioned additives could vary in a broad range (5-100%) dependent on the properties of a pack to be formed (β-factor value, permeability, burst strength, etc.).

The invention claimed is:

1. A method of proppant entrainment prevention comprising injecting sand and/or proppant and proppant material mixture in a final stage of a fracture filling process, wherein individual particles of the proppant material have a shape of blocks with a comb multi-channel structure with throughout channels of the ellipse or polygon cross-section, and wherein the polygon has at least three sides and the block containing channels has the ellipse or polygon cross-section, with a minimum number of polygon sides equal to 3.

2. The method of claim 1 wherein proppant material is selected from the group consisting of at least one of ceramics, glassworks, glass-ceramics, cement, expanded-clay lightweight concrete, polymer, and metal.

* * * * *